Aug. 21, 1923.

R. M. CORL 1,465,347

PROCESS OF AND APPARATUS FOR FORMING GLASS

Filed May 6, 1918   3 Sheets-Sheet 1

INVENTOR
Robert M. Corl.
By Owen, Owen & Crampton
His attys.

Aug. 21, 1923.

R. M. CORL

1,465,347

PROCESS OF AND APPARATUS FOR FORMING GLASS

Filed May 6, 1918 3 Sheets-Sheet 2

INVENTOR
Robert M. Corl.
By Owen, Owen & Crampton,
His attys.

Patented Aug. 21, 1923.

1,465,347

UNITED STATES PATENT OFFICE.

ROBERT M. CORL, OF MAUMEE, OHIO, ASSIGNOR, BY MESNE ASSIGNMENTS, TO ERIE GLASS COMPANY, OF TOLEDO, OHIO, A CORPORATION OF DELAWARE.

PROCESS OF AND APPARATUS FOR FORMING GLASS.

Application filed May 6, 1918. Serial No. 232,341.

*To all whom it may concern:*

Be it known that I, ROBERT M. CORL, a citizen of the United States, and a resident of Maumee, in the county of Lucas and State of Ohio, have invented a certain new and useful Process of and Apparatus for Forming Glass; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the glass working art, and particularly to the manufacture of sheet glass.

The primary object of my invention is the provision of an improved method of and apparatus for making glass in a simple, efficient and economical manner; and the invention broadly contemplates the accomplishment of such object by (1) procuring a mass of glass from a source of supply; (2) the lowering of the temperature of the glass with respect to its temperature at the source of supply and then raising the temperature of the glass at the forming zone a predetermined extent to obtain correct forming conditions; (3) the shaping and partial cooling of a mass of glass from its molten state, and subsequently, while still heated, raising the temperature to permit a drawing or flowing of the glass in predetermined shape from the mass; (4) the forming of an ingot from molten glass, and subsequently, while still heated, raising the temperature to permit a drawing or flowing of the glass in predetermined shape from the ingot; and (5) the provision of apparatus suitable for carrying out the process.

It is recognized in the art that to obtain a proper forming of sheet glass it is necessary to maintain an even and constant temperature in the forming zone of the mass from which the sheet is drawn, and it has been endeavored to accomplish this by maintaining the mass, as a whole, at an even constant temperature. In working large masses of glass, sometimes running into many tons, it is extremely difficult and expensive to maintain an even constant temperature in the mass. This objectionable condition is overcome, however, by my invention by maintaining an even constant temperature in the mass at the forming zone, which temperature is relatively different from that of the mass, whereby defects of temperature in the mass can be easily remedied or controlled. By the "forming zone" is meant the relatively restricted portion of the mass in which the product is forming.

For the purpose of more easily overcoming the defects of temperature and structure in the mass, as well as for reasons of economy and increased production, the working mass may be segregated from the source of supply and treated to obtain desired conditions of temperature and structure, such treatment preferably consisting in reducing the temperature of the segregated mass relative to the source of supply.

This application is filed in part as a continuation of application Serial No. 163,569, filed April 21, 1917, and contains claims to the subject matter common to both applications.

The invention is fully described in the following specification, and while, in its broader aspect, it is capable of being practiced in numerous ways and by the use of numerous forms and types of apparatus, a few only of such ways and apparatus are illustrated in the accompanying drawings, in which—

One method of practicing my invention, and as illustrated in my said former application contemplates the forming of an ingot from molten glass, and subsequently, preferably while the ingot is still in a heated state, raising the temperature to permit a drawing or flowing of the glass in predetermined shape from the ingot.

Figure 2:
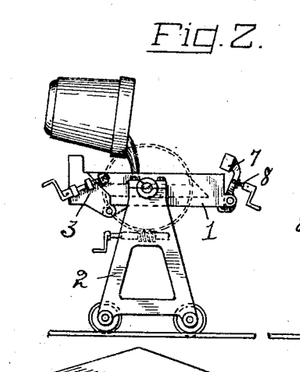
Fig. 2 is a side elevation of the ingot forming mold in receiving relation to a source of molten glass supply.

In accomplishing this the glass which forms the ingot is obtained from any suitable source of supply, as for instance, by ladling the same, from a furnace into a mold, as illustrated in Fig. 2, by which the glass is given a predetermined shape. It will be understood, however, that the manner of supplying the glass to the mold is not material, as this may be accomplished in numerous ways.

The ingot thus formed is introduced, preferably while still heated, but at a lower temperature than that of the mass at the source of supply, into a converter, where its temperature is raised and the product forming zone thereof, which is disposed at its forward end, subjected to a more intense converting or sheet forming heat. It is evident that the width of the formed sheet is determined by the width of the ingot at the flowing off end, and that the thickness of such sheet is determined by the temperature or intensity of the heat applied at the forming zone, and the auxiliary temperature used to assist in raising the temperature of the ingot to working condition, and the speed at which the formed sheet is moved or drawn away from the ingot.

It will be understood from the above that the ingot, when introduced into the converter, is preferably below the point of flowing and it is therefore necessary, for practical purposes, to gradually raise the temperature of the ingot to a degree that will enable the converting heat, which is applied at the forming zone, to easily bring the glass to a temperature which is necessary to the production of the sheet. The gradual raising of the temperature of the ingot within the converter may be accomplished by dividing the converter crosswise of the movement of the ingot therethrough, into heat zones, and increasing the temperature within these zones progressively toward the converting point or zone. The dividing of the converter into successive heat zones facilitates obtaining an even temperature throughout the mass, so that the temperature at the converting end of the ingot is practically uniform throughout its area.

In order that the sheet produced may be continuous in character it is necessary that each ingot, before reaching the converting point, be homogeneously attached to the rear end of the preceding ingot or ingots, and such attaching preferably takes place within the converter. To facilitate the attaching or homogeneous welding together of the adjacent ends of succeeding ingots, each ingot, before being advanced into the converter or before being moved into welding contact with the preceding ingot, has a softening heat applied to its forward end.

The ends of the ingots are preferably beveled in parallel planes which lend themselves to the securing of a maximum surface of contact with the preceding ingot in welding, and also, due to the fact of their being of the same general angle as that of the angle of the ingot at the drawing stage, secure a condition lending itself to the correction, while in the forming stage, of any fault caused by the welding. It will be understood that the area of the end angle of an ingot exposed to the action of the converting temperature tends to determine the quantity of glass worked to the forming stage, and consequently tends to determine the amount of glass at that point and the speed at which the glass can be removed from the ingot.

Burners and graft-controls are employed to secure a raising of the mass temperature to the point where it is converted into a sheet and also to produce the desired end angle at the converting end of an ingot. Burners are provided subjacent to the ingot and adjacent to the converting point to soften the bottom skin of the ingot and assist the converting action.

It is preferable, preparatory to introducing an ingot into the converter, to fire finish the top exposed surface thereof and then insert the ingot so that the fire finished surface forms its bottom when introduced into the converter, thereby securing at the lower edge of the ingot a true straight surface which, at the converting end of the ingot, assists materially in forming true and level glass. It will be understood, however, that the fire finished surface of an ingot is permitted to become sufficiently cooled before the ingot is inverted, and such finished surface placed upon a supporting means, to prevent a marking of such surface by the supporting means, which may constitute water-cooled rollers having a glazed surface.

As the sheet produced by the converting action advances, the speed of advance depends upon the temperature in the forming zone, the temperature in the mass, the rate of progression of the mass, the speed of progression and forming of the sheet, and the working surface exposed to the converting heat. The sheet is supported and guided in its movement by any suitable means and when advanced a predetermined distance enters a leer where it is cooled in a manner to eliminate strains, as is well understood in the art.

It will be understood that some suitable means is provided for advancing the formed sheet at the speed of forming thereof, and if desired, such advancing means may be given a speed sufficient to augment the natural flowing action of the glass from the ingot. An important feature of the invention consists in maintaining a predetermined relation between the travel or progression of the ware, and the converting conditions. It is evident that the speed of advance or progression of the ingot within the converter and the speed of advance of the formed sheet should bear a predetermined relation one to the other, and that they should also bear a predetermined relation to the converting temperature, or to the elements which control the speed of forming of the sheet.

Figure 1:
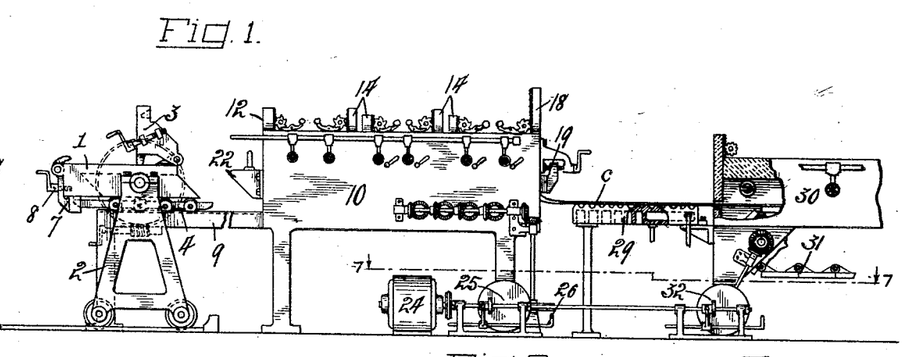
Figure 1 is a side elevation of one form of apparatus for practicing my invention, with parts broken away and with an ingot forming mold in discharging relation to the converter.
Figures 5, 6:
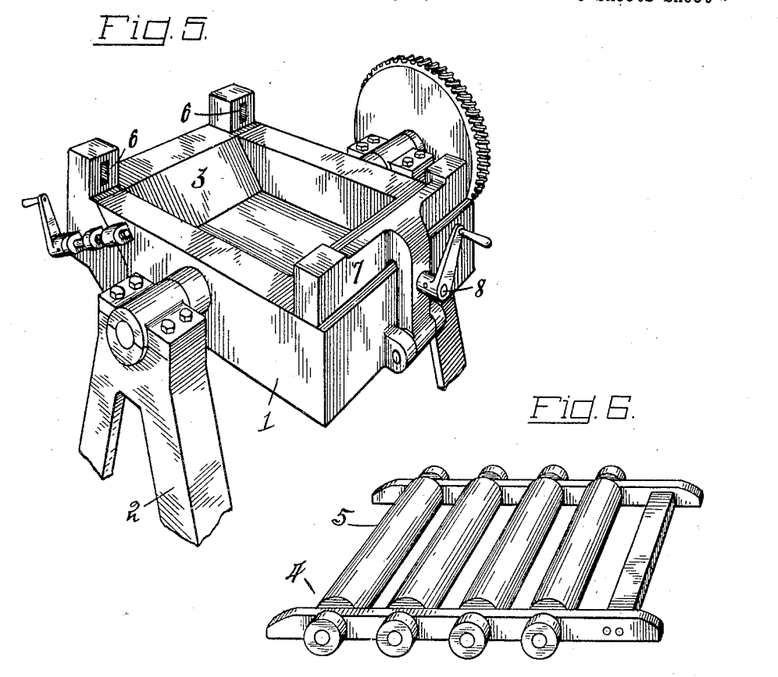
Fig. 5 is an enlarged top perspective view of an ingot mold in receiving position.
Fig. 6 is a similar vew of the carriage which may be employed to transfer an ingot from the mold to the interior of the converter.
Figure 7:
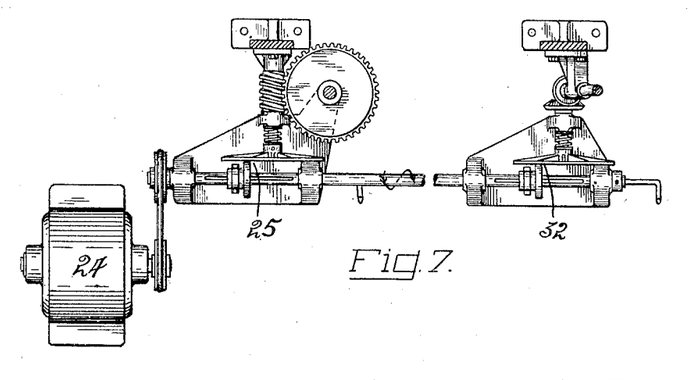
Fig. 7 is an enlarged section on the line 7—7 in Fig. 1.

The mold which I have illustrated for forming the ingots is designated 1, and is mounted for revoluble or inverting movements in a truck-frame 2 and is provided with a hinged end 3, which is adapted to be opened to permit an endwise discharge of the formed ingot from the mold. After an ingot has been formed within the mold and its top surface fire finished, if such fire finishing step is employed, a carriage 4 having a plurality of supporting rolls 5 is mounted over the mold and ingot and secured in position thereon by removable engagement of its side bars at one end with sockets 6 and at the other end with a clamping member 7, which is hinged to an end of the mold. The clamp 7 is secured in carriage holding position by a screw 8, which threads into the adjacent mold end. This having been done the mold is inverted and moved in position for the carriage 4 to rest on a track 9 extending from the ingot introducing end of a converter 10. The hinged end 3 of the mold is then opened to permit the ingot to be advanced from the mold with the carriage and introduced into the converter 10. It will be understood that while no means is shown for separating the sides of the mold from the ingot to facilitate a removal of the ingot from the mold, the sides of the mold may be adapted to have such movements if desired.

Figures 3, 4:
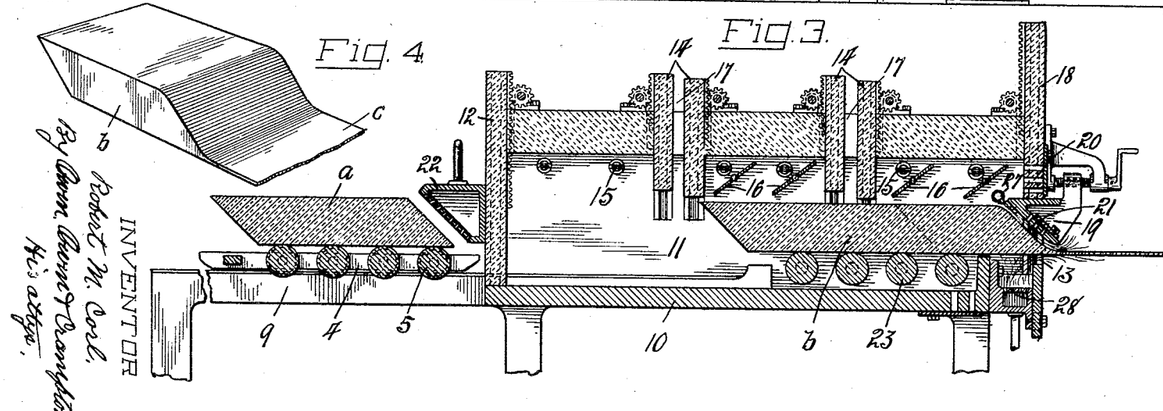
Fig. 3 is an enlarged vertical longitudinal section of the converter shown in Fig. 1, with an ingot in position to be introduced therein and added to the ingot in the converter and from which a sheet is forming.
Fig. 4 is a perspective view of an ingot from which a sheet is forming, with the sheet broken off.

The converter 10 has the interior heating chamber 11, the introducing end of which is adapted to be closed by a gate 12, while the forward or discharge end thereof is provided with a restricted opening 13 through which the sheet being formed advances. The chamber 11 is shown, in the present instance, as having the upper portion thereof divided by vertically adjustable gates 14 into successive zones, each of which is provided with burners 15, or other suitable means, to effect a heating thereof to a desired temperature. In practice, the heat is progressively raised from one end of the converter-chamber to the other so that the ingots introduced therein are gradually raised to a desired uniform temperature to correct faults therein. Draft-control or baffle-plates 16 may be disposed in any desired number within any or all of the zones of the converter-chamber and adjustably mounted to regulate the application of the heat to the advancing ingot. For instance, the baffle-plates may be so disposed with respect to the burners and the exit-flues, one or more of which may be provided, as indicated at 17, and with respect to the discharge opening 13 as to cause the flame or heat from the burners to be directed in a regulated stream over the ingot in impingement therewith.

The size of the discharge opening 13 is regulated as to width by a vertically movable gate 18, and this gate preferably carries a draft-control member 19 at its lower end for adjustment relative thereto toward and away from the forming end of an ingot which is being converted. The member 19 preferably has the wall thereof adjacent to the ingot shaped to conform to the desired forming angle of the ingot. The gate 18 may have draft-control vents 20 in its lower end portion, and the member 19 may also have draft-control vents 21 in the face thereof opposed to the forming end of the ingot. These draft-vents may be controlled by damper members.

The ingot $a$, which has been formed and deposited on the carriage 4 in position to be introduced into the converter-chamber 11, has the forward end thereof softened or raised to a welding condition by the application of a flame thereto from a burner 22, which may be carried by the gate 12, and the ingot is then removed into the converter with its forward end in abutment with the rear end of the ingot-column $b$ within the converter to effect an integral welding or homogeneous uniting of the ingot and column. The ingot column $b$ within the converter is supported in advance of the carriage 4 by rollers 23 within the bottom portion of the converter-chamber adjacent to its forward end, and such rollers may have their surfaces glazed and be cooled in any suitable manner. The rollers 23, in the present instance, act as drive-members for advancing the ingot-column and for such purpose are in driving connection with a motor 24. To facilitate a varying of the speed of driving of the rollers 23 a speed-change device is provided in such driving connection and, in the present instance, is shown as constituting a variable speed friction drive-means 25, the movements of the shifting member of which are controlled by a shipper-member 26.

The converting heat is applied to the forward end of the ingot-column b within the chamber 11 by a series of converting burners 27, which are disposed in position to augment the heat within the chamber at the forward end thereof and to apply a converting heat to the column at the forming zone.

Bottom burners 28 are provided below the ingot-column adjacent to the opening 13 to apply heat to the under side of the column to soften the bottom skin or surface thereof and to act on the bottom of the column in a manner to assist the converting heat in freeing the glass at the forming zone.

29 designates the table or supporting platform over which the formed sheet c passes in its movement from the converter to the leer 30. The table 29 is preferably disposed below the plane of emergence of the sheet from the converter and is intended to support the formed sheet and to prevent too great a sagging thereof before it becomes set. The top surface of the supporting table is preferably fluted or corrugated to reduce to a minimum its supporting contact with the sheet, and is also cooled by water, or in any other suitable manner.

The leer 30 is shown as being provided interiorly thereof with a conveyer 31 of the endless belt type by which the sheet is supported in its passage therethrough and is also advanced at a speed suitable to carry away the sheet as rapidly as formed by the converter and to create a tension at the forming zone, if such tension is desired. The speed of advance of the conveyer should be proportioned to the speed of advance of the ingot-column, as well as to the forming conditions. For the purpose of this control the drive-means for the conveyer 31 is connected to and driven from the motor 24 and a speed-control means 32, in the present instance, of the friction type is provided in such connection.

It will be understood that in starting a sheet produced by the above method a bait is attached to the forward end of an ingot-column, which end is suitably angled and heated to a converting condition, and the bait then drawn forward over the table 29 and a sufficient distance into the leer 30 for the sheet to be engaged by the conveyer 31, so that the further advance of the sheet is caused by the action of the conveyer. It should be understood that if desired, gripping means may be employed in the leer for purposes of advancement or creating a tension at the drawing zone. The gate 18 and attached draft-control member 19 may be raised from normal working position to facilitate the attaching of the bait to the column. In practice, all converter temperature conditions will be used in synchronism with the forming conditions.

It should be distinctly understood that the process does not contemplate at all times the employment of the various elements described as it is evident that the varying conditions demanded by different types of ware and different natures of glass and size, etc., will demand different adaptations. Therefore, several elements may be used in different relations, as for instance, some conditions will not require the inverting of the ingot before entering the converter, and in some types of ware the converter will consist mainly of a supporting means and possibly one heat zone, with the converting elements, and possibly extreme conditions may warrant the use of the converting means without the zones, as for instance, a converting heat may be applied to the ingot in the open atmosphere. It is evident that the apparatus shown is merely illustrative of one form of practicing my invention, and it is to be understood that this form of the invention contemplates broadly the segregating of a shaped mass from the source of supply, partially lowering its temperature, and then raising its temperature to effect the forming of a continuous sheet of lesser thickness than the shaped mass.

Figure 8:
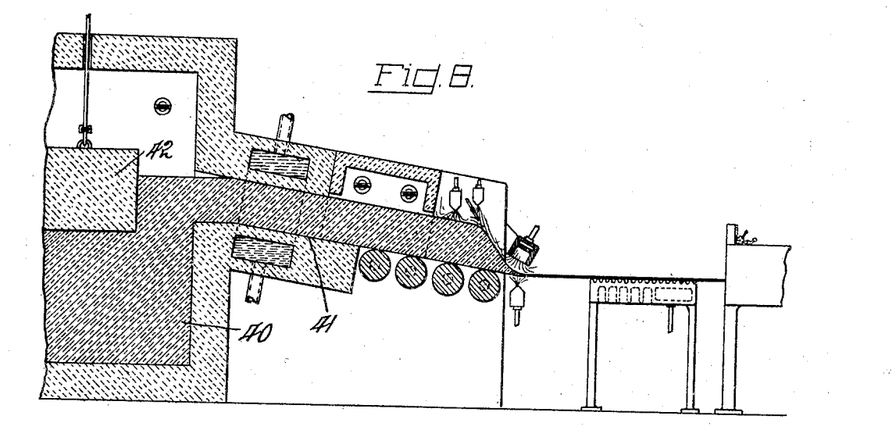
Fig. 8 is a modified form of the invention in which the continuity of the glass is maintained from the melting-pot or source of supply to the resultant sheet.

In Fig. 8 a different form of practicing the process is illustrated, in which the column, which is being converted into a continuous sheet, is shown as connected to its source of supply but having its converting end spaced a suitable distance from the source of supply, or subjected to a cooling action, whereby its temperature is sufficiently lowered below that of the source of supply to assume and maintain its shape preparatory to having the temperature thereof raised to a converting condition. In the apparatus illustrated for accomplishing this, 40 designates the furnace or source of molten glass supply and 41 a trough or discharge outlet from such furnace, through which the glass flows from the furnace. The cross-sectional contour of this discharge passage is the same in shape as the cross-sectional shape which it is desired to give to the column, and such passage is either of sufficient length to effect a natural lowering of the temperature of the stream to solidify it to a desired extent, or artificial means may be employed for effecting such lowering of the temperature. The temperature of the column as it moves forward may be raised at or adjacent to the converting zone to suit the converting conditions, the sheet then passing from the column and being itself treated as described in connection with the preferred form, or in any other suitable manner. The level of the supply mass in the furnace may be automatically maintained at a predetermined height by a displacing float 42, or in any other suitable manner.

Figure 9:
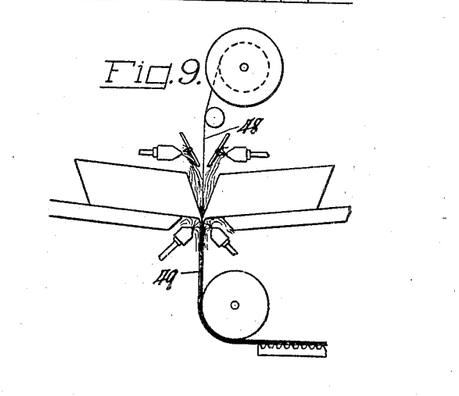
Fig. 9 illustrates one manner of utilizing my invention in the formation of reinforced sheet glass.

Figure 9 illustrates the application of my invention to the forming of reinforced sheet glass, a sheet of reinforcing material 48 being fed between the converting ends of two adjacent igots or columns, in such a manner as to enter beween the side surfaces of a joint sheet 49 formed by the two columns.

It is evident that in each form of the invention illustrated a converting heat is applied at a relatively restricted sheet forming zone of the mass to impart a temperature to the glass in such zone, which is different from the temperature of the mass, whereby to correct improper forming conditions in the mass; that in each form illustrated, the mass from which the sheet is directly formed is segregated from its source and chilled relative thereto, and the temperature of a relatively restricted portion of the segregated mass then raised to a correct forming condition; that in the forms of the invention illustrated in Fig. 8, the mass which is segregated from its source and chilled relative thereto is maintained in unbroken connection therewith; that in the form of the invention illustrated in Figs. 1, 2 and 9 the chilled mass is completely segregated or separated from its source, and that in the forms illustrated in Figs. 1, 2, 8 and 9 the segregated mass is chilled sufficiently to maintain a shape under normal conditions, while in the forms illustrated in Figs. 1, 2 and 9 the chilled mass is shaped into individual ingots.

I wish it understood that the forms of apparatus herein described and shown for practicing my invention are merely for the purpose of illustration and not to restrict the scope of the invention further than defined in the claims, and that the process is not limited to use in connection therewith, as any apparatus suitable for the purpose may be employed.

Having thus described my invention what I claim is new, and desire to secure by Letters Patent is:—

1. The process of converting a set column of glass into a column of dissimilar cross section which consists in holding the set column with its end surface at an angle to the horizontal, progressively applying melting heat to the end surface and allowing the molten surface glass to flow over the set glass and thereby change the relative dimensions of the cross section.

2. The process of converting a set column of glass into a sheet which consists in holding the column with its end surface at an angle to the horizontal, progressively applying a melting heat to said surface, and allowing the surface glass to flow across and from the set glass in sheet form.

3. The process of manufacturing sheet glass comprising applying a melting heat to a localized portion of a set mass of glass to flow therefrom a sheet of lesser thickness than the mass, advancing the mass to compensate for the flow of glass therefrom and to maintain a substantially fixed relation between the source of heat and the surface of the mass to which the heat is applied, and successively removing predetermined quantities of glass from a supply of molten glass, permitting them to chill to set condition and successively attaching them to the rear end of the glass mass from which the sheet is flowing and thereby maintaining the continuity of the mass and the flow of the sheet therefrom.

4. The process of manufacturing sheet glass which comprises segregating a mass from a supply of molten glass, permitting the mass to set in rectangular shape in cross-section and with the upper surface free from contact, inverting the mass, and progressively applying heat to one end of the mass and permitting the heated glass to flow from the mass in sheet form.

5. The methd of forming sheet glass consisting in providing a set mass of glass of rectangular form in cross-section and having a beveled edge, raising the temperature of the mass and applying a converting heat to said edge to flow glass therefrom in sheet form.

6. The method of forming sheet glass, which consists in progressively raising the temperature of a glass ingot of rectangular form in cross-section from one to the other of opposite edges thereof, the heat at the more highly heated edge of the ingot being such as to cause a surface flow of glass therefrom in sheet form, and applying a drawing tension to the sheet flowing from the ingot, the ingot being progressed in the general direction of flow of the sheet therefrom to compensate for such flow.

7. The method of forming sheet glass, which consists in uniting separate ingots of glass of rectangular form in cross-section to form a continuous column, gradually raising the temperature of the glass column toward one end thereof to a flowing temperature at such end whereby the glass is permitted to flow continuously therefrom in sheet form.

8. The method of forming sheet glass, which consists in uniting separate glass ingots to form a continuous homogenous column, subjecting said column to a temperature which gradually raises the temperature of the column toward its working end to a flowing state at such end whereby the glass is permitted to flow from the working end of the column in continuous sheet form, the working end of the column being of beveled form.

9. The method of forming sheet glass, which consists in progressing a glass column of rectangular form in cross-section through a heated chamber in which the heat is gradually increased in the direction of progression of the column, the forward end of the column, when at a predetermined point in the chamber, attaining a temperature whereby the glass is permitted to flow therefrom in continuous sheet form of a width determined by the width of the column.

10. The method of forming sheet glass, which consists in subjecting a glass column to a temperature raising heat which is of greatest intensity at its forward end to permit a flowing of glass therefrom in sheet form, advancing the column to compensate for the flowing of the glass therefrom, and successively homogeneously uniting glass ingots to the rear end of said column to maintain the continuity of the sheet.

11. The method of forming sheet glass which consists in subjecting a glass column of rectangular form in cross-section to a temperature raising heat which is of greatest intensity at its forward end to permit a flowing of glass therefrom in sheet form, advancing the column to compensate for the flowing of glass therefrom, and successively homogeneously uniting glass ingots to the rear end of said column to maintain the continuity of the sheet, the ends of the ingots being beveled to facilitate welding and sheet forming conditions.

12. The method of forming sheet glass which consists in subjecting a glass column to a temperature raising heat which is of greatest intensity at its forward end to permit a flowing of glass therefrom in sheet form, and advancing the column to compensate for the flowing of glass therefrom, the forward end of the column being initially beveled to facilitate the flowing of glass in sheet form therefrom.

13. The method of forming sheet glass which consists in subjecting a glass column of rectangular form in cross-section to a temperature raising heat which temperature is of greatest intensity at the forward end of the column to effect a surface flowing of glass therefrom in continuous sheet form, and relatively moving the column and temperature raising heat to compensate for the flow of glass from the column, the forming end of the column having an initial angle substantially conforming to the desired angle of flow of the glass therefrom.

14. The method of forming sheet glass, which consists in forming an ingot from molten glass, fire finishing the top surface of the ingot, then inverting and advancing the ingot into and through a heated atmosphere whereby the forward end of the ingot at a predetermined point in its advance is raised to a sheet forming temperature to permit the flow of glass therefrom in sheet form, the formed sheet being advanced at a speed proportionate to the forming of the sheet.

15. The method of forming sheet glass, which consists in applying heat to a portion of a heated mass of glass of set rectangular form in cross-section to effect a flowing of a relatively thin skin from the mass in continuous sheet form.

16. The method of forming sheet glass, which consists in providing a heated mass of glass of set rectangular form in cross-section and applying a heat raising temperature to a superficial portion thereof to effect a flowing of such portion in sheet form over and from the cooler portion of the mass.

17. The method of forming sheet glass, which consists in forming ingots from molten glass, and while still heated, successively uniting the ingots to form a homogeneous column of rectangular form in cross-section, advancing the column in substantially a horizontal plane and subjecting it during such advance to a heat raising temperature to flow glass in sheet form from an end thereof.

18. The method of forming sheet glass, which consists in heating the working end of a heated glass ingot of rectangular form in cross-section, to flow a superficial portion of the ingot over the cooler mass at an incline to the plane of advance of the resultant sheet.

19. The method of forming sheet glass, which consists in providing a glass column of set substantially rectangular form in cross-section, fire finishing a surface thereof, and then raising the temperature of the column to flow glass in sheet form from an end thereof.

20. The method of forming sheet glass, which consists in providing a mass of glass of predetermined shape in cross-section to provide a broad edge and chilled at least to an extent to maintain a shape, applying heat to the mass to flow glass in sheet form from said edge, the sheet being substantially coextensive in width with the edge from which it flows.

21. The method of forming sheet glass, which consists in providing a mass of glass chilled at least to an extent to maintain a predetermined shape in cross-section and having a broad working edge, applying heat thereto to flow glass in sheet form from the working edge, the heat being of greatest intensity at said edge and uniformly distributed thereover longitudinally thereof whereby the sheet is co-extensive in width with that of said edge.

22. The method of forming sheet glass, which consists in providing a mass of glass of rectangular form in cross section and sufficiently cool to maintain a shape, advancing the mass through means for obtaining a predetermined substantially uniform temperature condition in the mass and then applying a converting heat to the forward end of the mass to cause a sheet of less thickness than the mass to flow across and from the end of the mass.

23. In combination, means forming a heating chamber and including means for supporting and conveying a mass of glass of set form through the chamber, means for applying a localized heat to the mass within the chamber to flow glass in sheet form from the mass.

24. In combination, means forming a heating chamber, means for supporting and conveying a set mass of glass through the chamber, and means for heating the forward end of the mass to flow therefrom a sheet of lesser thickness than the mass.

25. In combination, means forming a heating chamber, means for supporting and conveying a set mass of glass through the chamber, means for heating the forward end of the mass to flow therefrom a sheet of lesser thickness than the mass, and means for operating the supporting and conveying means to advance the mass at a speed proportioned to the speed of flow of the sheet therefrom.

26. In combination, means forming a heating chamber, means for supporting and conveying a set mass of glass through the chamber, means within the chamber for progressively raising the temperature of the mass toward its forward end, and means for applying a melting heat to the forward end of the mass to flow therefrom a sheet of lesser thickness than the mass.

27. In combination, means forming a heating chamber, means for supporting and conveying a set mass of glass through the chamber, means within the chamber for progressively raising the temperature of the mass toward its forward end, means for applying a melting heat to the forward end of the mass to flow therefrom a sheet of lesser thickness than the mass, and means for operating the supporting and conveying means to advance the mass at a speed to compensate for the flow of the glass therefrom.

28. In combination, means forming a heating chamber, means for supporting and conveying a set mass of glass in sheet form through the chamber, means for applying a melting heat to the forward end of the mass to flow therefrom a sheet of lesser thickness than the mass, and means operable to successively add to the rear end of the mass to maintain the continuity of flow from the forward end thereof.

29. In combination, means forming a heating chamber, means for supporting and conveying a mass of glass at predetermined speed through the chamber, means for heating the mass within the chamber to progressively raise the temperature of the mass toward its forward end, means for applying a melting heat to the forward end of the mass throughout a localized area to flow glass in sheet form from the mass, and means for supplying glass to the rear end of the mass to maintain the continuity of flow of glass therefrom.

30. In combination, means forming a heating chamber, means within the chamber for supporting and conveying a mass of glass through the chamber at a predetermined speed, means for applying a melting heat to the forward end of the mass to flow therefrom a sheet of lesser thickness than the mass, and means for carrying away the formed sheet at a speed proportioned to its speed of flow from the mass.

31. In combination, a chamber, means for supporting and advancing a set mass of glass of broad rectangular form through the chamber, and means for applying a melting heat to the forward end of the mass within the chamber to flow therefrom a sheet of lesser thickness than the mass.

32. In combination, means for supporting and advancing a set mass of glass, means for applying a melting heat to the forward end of the mass to flow therefrom a sheet of lesser thickness than the mass and of a width substantially equal to that of the mass, and means for supplying glass to the rear end of the mass to compensate for the flow of glass from its forward end and to maintain the continuity of such flow.

33. In combination, means for applying a melting heat to the forward end of a set mass of glass to flow therefrom a sheet of lesser thickness than the mass, and means for advancing the mass at a speed to compensate for the flow of the sheet from the mass.

34. In combination, means for applying a melting heat to the forward end of a set mass of glass to flow therefrom a sheet of lesser thickness than the mass, means for advancing the mass at a speed to compensate for the flow of the sheet from the mass, and means for carrying away the sheet as it flows from the same.

35. In combination, means for applying a melting heat to a localized end portion of a set mass of glass to flow therefrom a sheet of lesser thickness than the mass, means for advancing the mass to compensate for the flow of glass therefrom and to maintain a substantially fixed relation between the heating means and the surface of the mass to which the heat is applied, and means operable to successively receive predetermined quantities of glass from a source of molten supply, permit a chilling thereof to set condition and then attach it to the rear end of the glass mass from which the sheet is flowing to maintain the continuity of the mass and the flow of the sheet therefrom.

36. In combination, means for advancing a set mass of glass, means for applying a converting heat to the forward end portion of said mass at an angle which is inclined to the direction of movement of the mass to flow from the mass a relatively thin sheet of glass.

37. In combination, a chamber having an outlet opening at one end, means to support a set mass of glass and means for applying a converting heat to a set mass of glass within the chamber to flow a sheet of lesser thickness from an edge portion of the mass through said opening, the size of said opening being regulable.

38. In combination, a chamber having an outlet opening at one end, means to support a set mass of glass within the chamber, and a gate for regulating the size of the opening, the edge of the gate next the opening consisting of heating means adapted to apply a converting heat to the set mass of glass to flow a sheet of lesser thickness from an edge portion of the mass through the opening.

39. In combination, a chamber having an elongated rectangular opening, an adjustable gate forming one side of the opening, and means within the chamber for supporting and progressing towards the opening a set mass of glass rectangular in cross-section, the edge of the gate next the opening consisting of a heater adapted to apply a converting heat to the approaching end of the mass of glass and flow a sheet therefrom through the opening.

40. In the manufacture of sheet glass, a converting chamber, means for delivering a mass of glass in set form to said chamber, and means for applying a melting heat to an end portion of the mass within the chamber to flow therefrom a sheet of lesser thickness than the mass.

41. In the manufacture of sheet glass, a converting chamber, means for delivering a mass of glass in set form to said chamber from a molten source of supply, and means for applying a melting heat to an end portion of the mass within the chamber to flow therefrom a sheet of lesser thickness than the mass.

42. In the manufacture of sheet glass, a converting chamber, a source of molten supply, means for receiving glass from said source, permitting it to set to maintain a shape and delivering it to the chamber, means for applying a converting heat to the mass to flow the glass in sheet form from an edge thereof, and means for advancing the mass in the chamber at a speed proportioned to compensate for the flow of the glass from the mass.

43. In the manufacture of sheet glass, means for supporting and advancing a mass of glass, means for receiving a quantity of glass from a molten source, permitting it to set in a predetermined shape and delivering it to the said first means, and means for applying a converting heat to the set mass of glass on said supporting and advancing means to flow glass in sheet form from the forward part thereof.

44. In the manufacture of sheet glass, means for supporting and advancing a mass of glass, means for receiving a mass of glass from a source of molten supply, permitting it to set in a predetermined shape and inverting it on said first means, and means for applying heat to the mass to flow glass in sheet form therefrom.

In testimony whereof, I have hereunto signed my name to this specification.

ROBERT M. CORL.